United States Patent [19]

Gilbreath et al.

[11] 4,107,773
[45] Aug. 15, 1978

[54] ADVANCED ARRAY TRANSFORM PROCESSOR WITH FIXED/FLOATING POINT FORMATS

[75] Inventors: Cecil R. Gilbreath; Jimmie L. Womble, both of Houston, Tex.

[73] Assignee: Texas Instruments Incorporated, Dallas, Tex.

[21] Appl. No.: 469,258

[22] Filed: May 13, 1974

[51] Int. Cl.² .......................... G06F 9/16; G06F 9/18; G06F 9/20; G06F 15/34
[52] U.S. Cl. ..................................... 364/200; 364/704
[58] Field of Search ..................... 340/172.5; 364/200 MS File, 900 MS File, 704

[56] References Cited

U.S. PATENT DOCUMENTS

| | | | |
|---|---|---|---|
| 3,346,851 | 10/1967 | Thornton | 340/172.5 |
| 3,363,234 | 1/1968 | Erickson et al. | 340/172.5 |
| 3,462,741 | 8/1969 | Bush et al. | 340/172.5 |
| 3,537,074 | 10/1970 | Stokes et al. | 340/172.5 |
| 3,541,516 | 11/1970 | Senzig | 340/172.5 |
| 3,560,936 | 2/1971 | Busch | 340/172.5 |
| 3,564,509 | 2/1972 | Perkins et al. | 340/172.5 |
| 3,573,741 | 4/1971 | Gavril | 340/172.5 |
| 3,634,883 | 1/1972 | Kreidermacher | 340/172.5 |
| 3,701,976 | 10/1972 | Shively | 340/172.5 |
| 3,702,988 | 11/1972 | Haney | 340/172.5 |
| 3,774,161 | 11/1973 | Chambers | 340/172.5 |
| 3,787,673 | 1/1974 | Watson et al. | 340/172.5 |
| 3,806,878 | 4/1974 | Edstrom | 340/172.5 |
| 3,825,901 | 7/1974 | Golnek, Sr. | 340/172.5 |

*Primary Examiner*—James D. Thomas
*Attorney, Agent, or Firm*—Rene' E. Grossman; James T. Comfort; Thomas G. Devine

[57] ABSTRACT

A special purpose hardware peripheral which acts as a high speed auxiliary processor. Read-only memory controllers and floating point arithmetic are used to accurately produce high speed processing of arrays of data, thus effectively increasing the processing power of the minicomputer. The system employs an internal memory of two independent sections with means for parallel (simultaneous) operation; employing one section in conjunction with an arithmetic unit while employing the other section in conjunction with data transfer to and from CPU main memory. Three ROM controllers are employed for controlling this simultaneous operation of the memory, the arithmetic unit and the data transfer to and from CPU main memory.

13 Claims, 6 Drawing Figures

ADVANCED ARRAY TRANSFORM PROCESSOR WITH FIXED/FLOATING POINT FORMATS

This invention relates to a high speed, special purpose auxiliary processor which performs repetitive type arithmetic operations on strings of sequential data (arrays).

More particularly, the processor operates as a direct memory access (DMA) peripheral device to address, fetch, process and store data arrays in central memory with a minimum of intervention by a central processor unit.

Application of minicomputer systems to gather and handle seismic data is prompted by the increasing demand for much more efficient, rapid and complete analysis of raw seismic data. Minicomputer systems can efficiently handle a great number of seismic data handling tasks with ease. However, when more advanced signal processing functions such as convolution, Fourier transform, complex arithmetic, spectral analysis, etc., are desired, computers heretofore are found to be inefficient. This is due to the fact that most minicomputers are general purpose machines intended for sequential instruction processing. Further, most minicomputers are limited to fixed point arithmetic capbility with limited accuracy. Thus, the minicomputer is ideally suited for the less critical tasks such as diagnostics, gain recovery and AGC, demultiplexing, editing, static corrections, simple NMO corrections, compositing (stacking), and general system control (bookkeeping). However, when more complex processing applications are required, special purpose hardware peripherals must be used to efficiently accomplish such tasks with requisite speed and accuracy, thus multiplying the processing power of the mini-system.

Array transform systems are presently commercially available which are not well suited to seismic signal processing. None include the full capability of the present processor. Most prior transform systems are limited to fixed point computation and thereby are greatly restricted as to computational accuracy and versatility. Others which have floating point capability are restricted in many other respects such as input/output formats, computational limitations and speed, flexibility, versatility, and seismic special function capability.

The present processor is an auxiliary processor which performs high speed processing of arrays of data, using floating point arithmetic. It operates as a direct memory access (DMA) peripheral processor and addresses, fetches, processes and stores data in memory with a minimum of central processing unit (CPU) intervention. The operations are organized in a pipeline structure which permits overlapping and paralleling of functions to achieve effective high speed for sequential sets of output results.

Preprogrammed read only memories (ROM), containing microprograms, control the addressing of central memory locations, the routing of data in the processor, and the processing of the data.

Since the present processor is microprogrammed, special purpose adaptations can be made by the user by changing or modifying the microprogram.

Two sets of buffer memories act to reduce the demands of the processor upon main memory when performing iterative operations such as Fast Fourier Transform (FFT) and Convolver (filter) operations.

In accordance with the invention, a special purpose hardware peripheral processor is provided which is a high speed auxiliary processor using floating point arithmetic. Processing, addressing, fetching, and storing of data in central memory is accomplished with minimum central processor unit (CPU) intervention. Optional formats, microprogrammed read only memory controllers, and a pipeline operation accommodate indexing, counting, and memory accessing in parallel with arithmetic operations.

More particularly, the arithmetic unit provides for array signal processing. A processor memory has two independent sections. A read bus and a write bus connect the central memory to both sections of the processor memory and to the arithmetic unit. Control means operates to alternate between the two sections of processor memory, a first flow of data words between the central memory and the processor memory and a simultaneous second flow between the processor memory and the arithmetic unit. The control means includes microprogrammed ROMs connected to the arithmetic unit and to the processor memory. A central memory address unit responds to one of the ROM controllers to control concurrent reading and writing of the central memory.

In a more specific aspect, each control unit has a multistate multibit per state ROM, and an address register to store the address to select a ROM state. A test (decision) section is responsive to selected programmable test bits in a present state output of the ROM and are connected to selectable test logic to check for the existence of predetermined sets of conditions. Means are provided to actuate the test unit and store the next state address in the register in dependence of the results of the tests.

In a further aspect, three sets of mutually exclusive tests are carried out by the test unit and any one of four addresses is loaded into the register, where one such address is loaded only by default.

Multistate processor read/write, address control, and process control programs are stored in three independent ROM sets. ROM program states are shifted in accordance with satisfied process test conditions. Specific programmable ROM bits control common flags which serve to link (synchronize) the three ROM controllers.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

Figure 3:
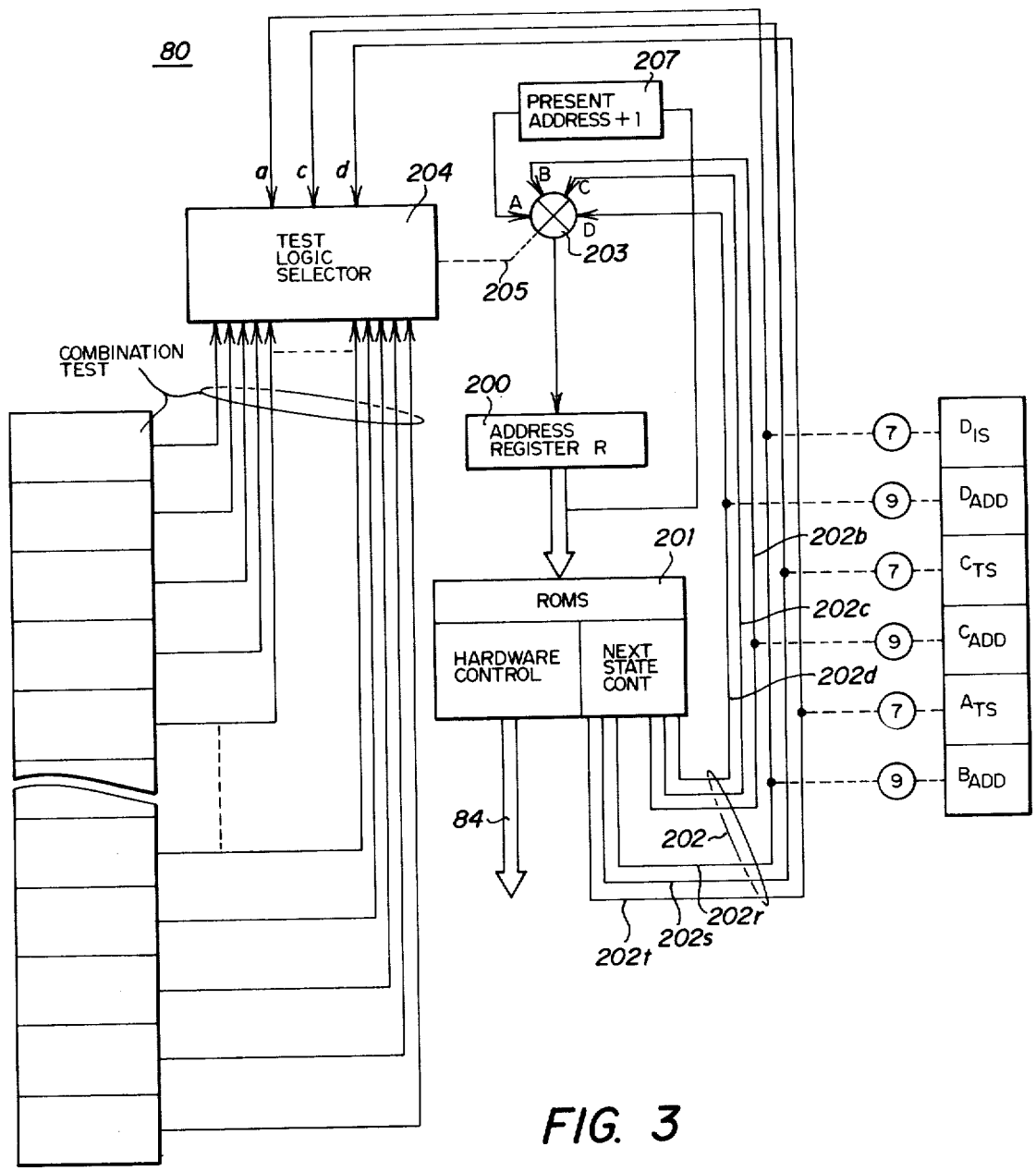
Figure 4:
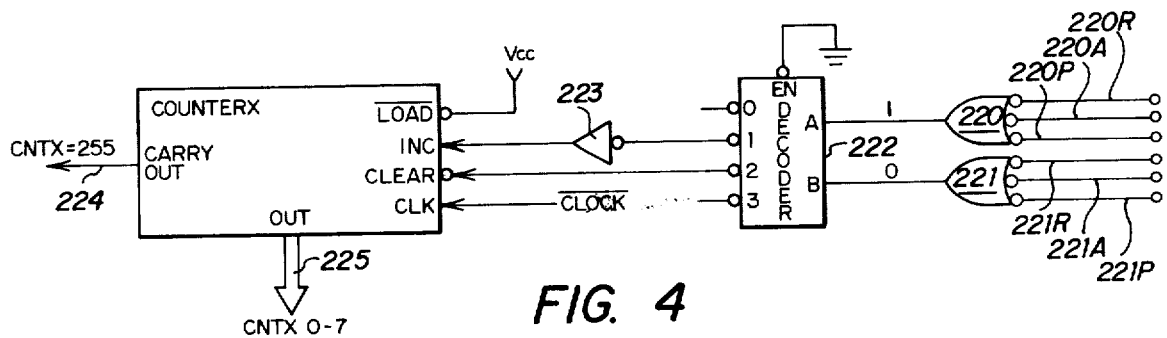
Figure 5:
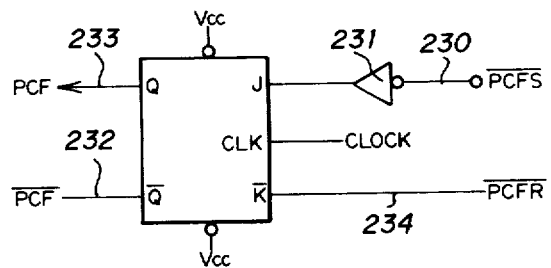

FIG. 3 details typical operation and construction of one of the three controllers involved in the processor;

FIG. 4 illustrates the utilization of processor control ROM bit to control the memory unit;

FIG. 5 illustrates typical ROM bit control and reset of the flags; and

Figure 6:
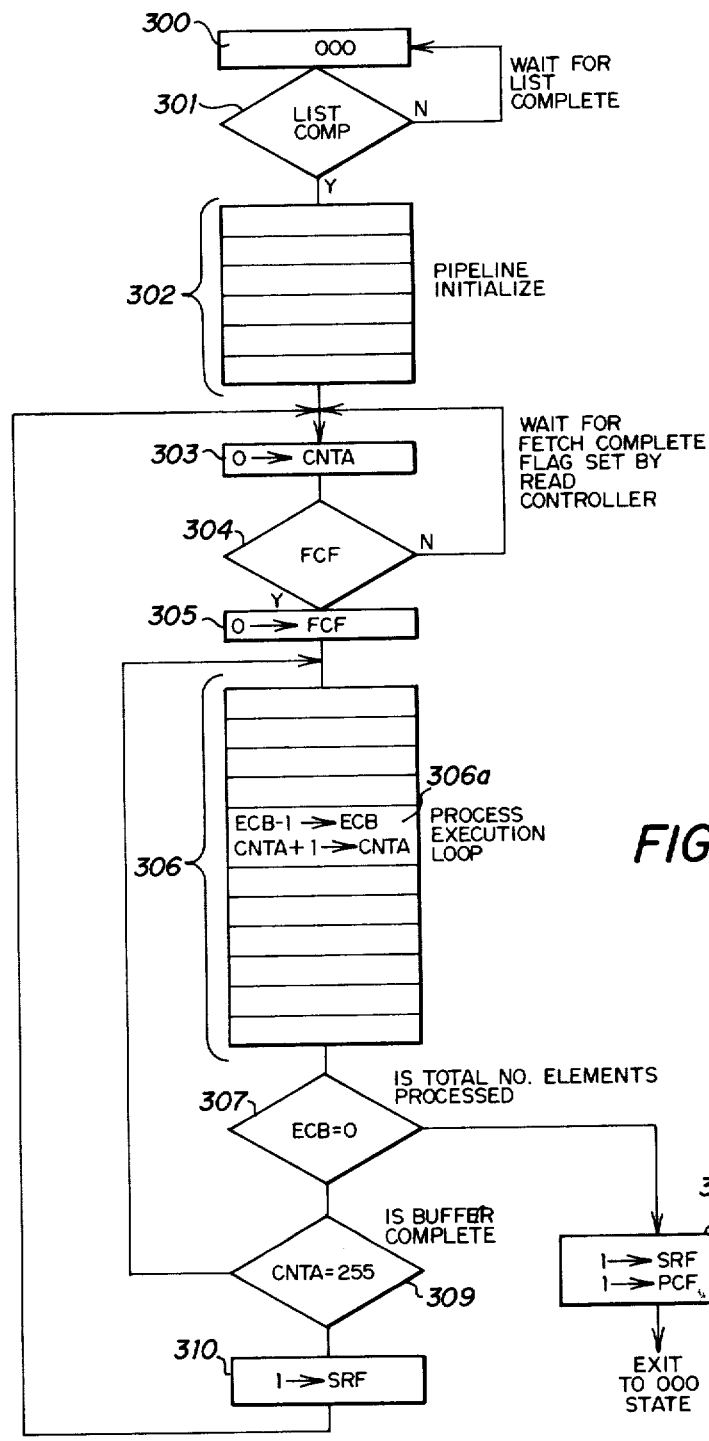

FIG. 6 is an executive level flow diagram of a process in execution.

Figure 1:
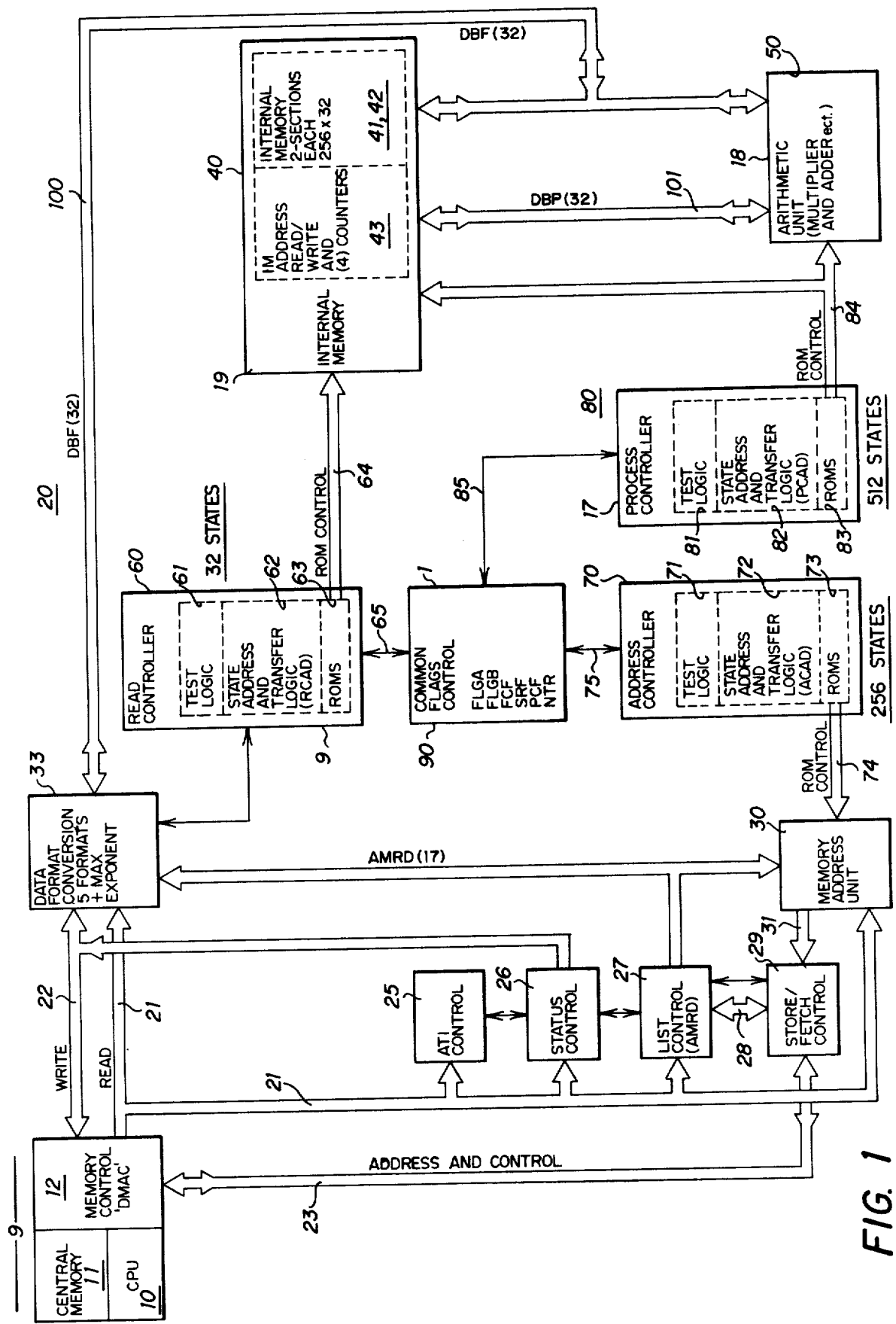
FIG. 1 is a system block diagram of the processor of the present invention.

FIG. 1 illustrates the general relationship of components of an array processor 20, a general purpose computer 9 and the interface components therebetween.

Computer 9 comprises a CPU 10 with a central memory 11 and a memory control DMAC 12.

In a preferred embodiment, processor 20 is attached to the DMA (direct memory access) channel 12 of computer 9. Computer 9 preferably is of the type manufactured and sold by Texas Instruments Incorporated of Dallas, Tex., and identified as the Model 980A Computer. This computer is described in detail in a series of manuals published in 1972 by Texas Instruments Incorporated and identified as Modle 890A computer.

Computer 9 communicates to the array processor 20 of the present invention by way of a read data bus 21, a write data bus 22 and an address bus 23. Read bus 21 is connected to elements comprising a standard control interface which is normally employed with a computer such as the 980A. In the present case, bus 21 is connected to an ATI (automatic transfer instruction) control unit 25, a status control unit 26 and a list control unit 27. The list control unit 27 is connected by way of a bus 28 to a store/fetch control unit 29 to which the address bus 23 is connected.

The bus 21 is also connected to a memory address unit 30 which communicates with the store/fetch unit 29 by way of bus 31. Detailed structure of a controlled interface similar to that comprised of elements 25–30 is provided in a Texas Instruments Incorporated manual entitled "Disc Memory Controller Maintenance Manual, Computer Field System" (CPS I). Manual No. 969259-9701, issued Aug. 1973. The status control unit 26 is connected to the read/write bus 22. List control unit 27 is connected by way of a bus 32 to the memory unit 30 and to a data format conversion unit 33.

It will be recognized that the interface units 25, 26, 27, 28, 29, 30 and 31 serve in a conventional manner to control the flow of data and other information to and from memory 11 and to monitor operations such as status and control instruction. ATI control 25, status control 26, list control 27 and the store/fetch control unit 29 all interact with one another in serving as the interface between the computer and the array processor 20.

Processor 20 comprises five main elements. The first is an internal memory unit 40 which is organized as two separate memory sections 41 and 42 with their associated address counters and read/write control components 43.

The second major component of processor 20 is an arithmetic unit 50 comprised of an arithmetic logic unit for add and subtract and move operations. In addition, a multiplier section is provided in the arithmetic unit 50.

A third major element is a read controller 60 which is comprised of a test logic section 61, a state address transfer control 62 and a set of associated ROMs 63.

A fourth major element is an address controller 70 which is made up of a test logic unit 71, a state address and transfer control 72 and a set of associated ROMs 73.

A fifth element of the system is a process controller 80 which comprises a test logic unit 81, a state address transfer controller 82 and an associated set of ROMs 83.

A sixth component of processor 20 is a common flag control unit 90.

A data output bus 100 leading from the format conversion unit 33 is a bidirectional bus which leads to and from the formatter 33. Bus 100 also connects the internal memory unit 40 to the arithmetic unit 50. A processor bus 101 interconnects the arithmetic unit 50 and the memory unit 40 for bidirectional flow of data between memory 40 and arithmetic unit 50.

Control of arithmetic unit 50 and major aspects of the memory unit 40 is exercised by the process controller 80 by way of ROM section 83. Selected ROM bits are connected by way of ROM control bus 84 to arithmetic unit 50 and to memory 40. Memory 40 is also controlled by way of a bus 64 which leads from selected bits in the ROM set 63 in controller 60.

Memory address unit 30 is controlled by way of bus 74 which connects selected ROMs in the unit 73 to the memory address unit 30.

Common flag control 90 communicates with the three controllers by way of channels 65, 75 and 85, respectively.

In accordance with the present invention, the structure of processor 20 is arranged such that highly efficient operations are possible. This will permit the carrying out of very complex array transform type of operation in real time. More particularly, the system is particularly suited for seismic signal processing operations. During acquisition of seismic records, multibit seismic sample words are acquired in multiplex form. Samples are taken of a multiplicity, as many as sixty, separate signal channels on the order of one sample for each channel during sample intervals that do not exceed about 4 milliseconds, i.e., 60 32 bit words every 4 milliseconds. Operations involved in executing instructions of Table V set out hereinafter is made possible in real time by the present invention. Memory 40 is a high speed memory. Associated controls and arithmetic components are made compatible for such high speed operations. To process seismic data in real time, special process structure is employed in conjunction with the components thereof which will permit the high speed execution of any one of the selected instructions.

In one embodiment of the invention, the internal memory sections 41 and 42 each comprised 256 addressable memory locations of 32 bits each. These are high speed bipolar Schottky TTL memory units. Further, memory sections 41 and 42 are independently accessable by the address controller 70, read controller 60 or process controller 80.

In normal operation of the system, the address controller 70 and read controller 60 operate exclusively with one of the memory sections 41 or 42, while the process controller 80 operates exclusively with the other of the two sections 41 and 42. By this means, the system conducts two separate operations in parallel: (a) storing and fetching of data by the read controller 60 and address controller 70, and (b) processing data under the control of the process controller 80. Therefore, the three controllers 60, 70 and 80 operate simultaneously and in parallel to greatly enhance the efficiency of the system.

The three controllers are synchronized one with the other through the common flag control unit 90 which serves to identify the particular activity of each of the controllers 60, 70 and 80 through specified tests to indicate the status of each controller. In one embodiment of the invention, elements of memory sections 41 and 42 were of the type manufactured and sold by Texas Instruments Incorporated and identified as catalog No. S74S200, Schottky TTL type of bipolar memory having a 60 nanosecond access time maximum.

Figure 2:
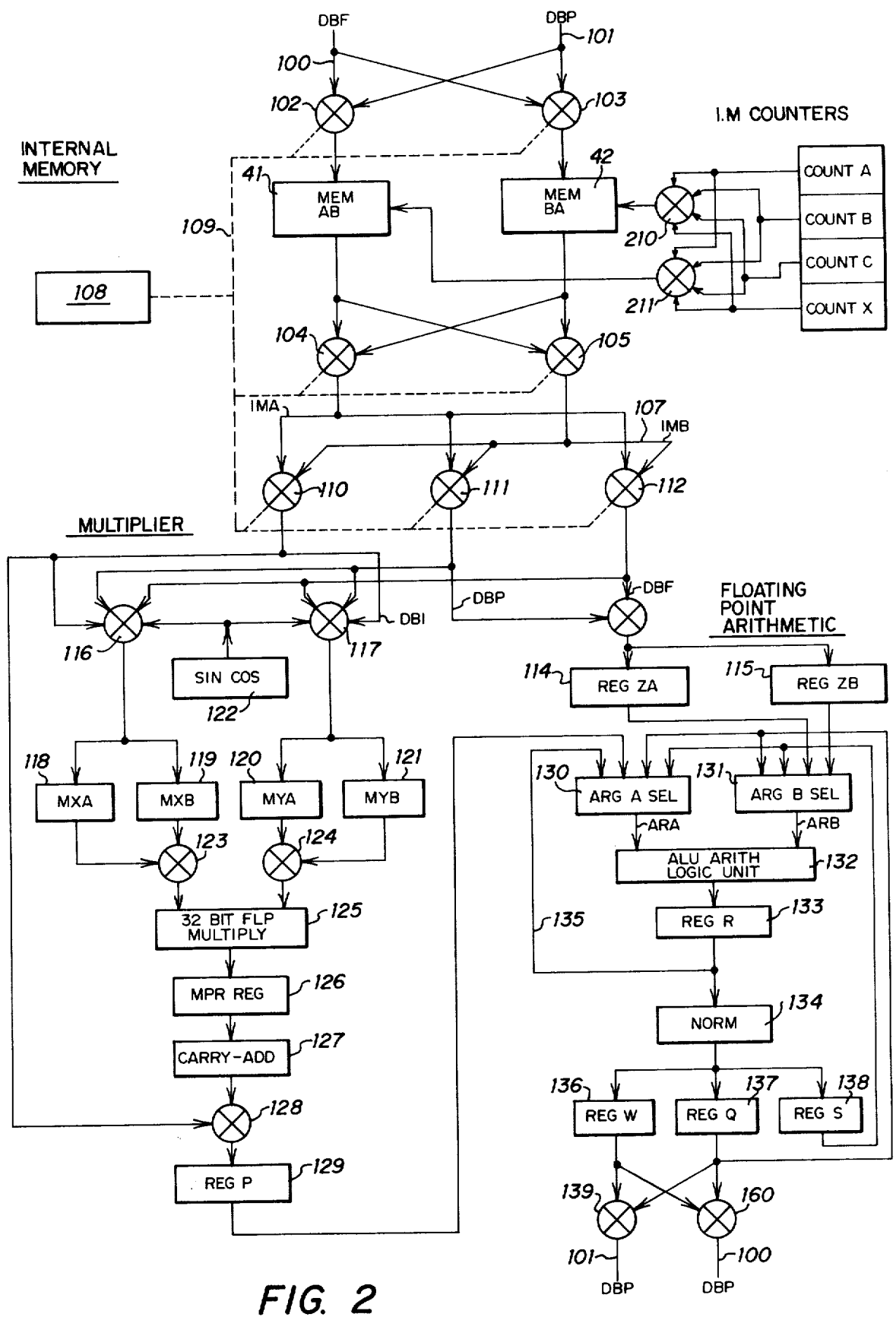
FIG. 2 is a detailed diagram of the memory and arithmetic unit of the processor.

In FIG. 2, memory 40 and arithmetic unit 50 have been shown interrelated. In this system, the DBF bus 100 is shown connected to memory sections 41 and 42 by way of selectors 102 and 103. The DBP bus 101 is also connected to memory sections 41 and 42 through selectors 102 and 103. The output of sections 41 and 42 similarly are connected through output selectors 104 and 105. Thus, there are two output buses 106 and 107 either of which carry the output from memory unit 41 or the output from memory 42. A selector control unit 108 is connected by way of linkages 109 to selectors 102, 103, 104 and 105. Thus, while memory unit 41 is sending processed data to central memory 11 and receiving from central memory 11 new data to be processed, memory unit 42 is employed to supply data to the arithmetic unit 50 and receive processed data from AU 50. By proper actuation of selectors 102–105, parallel operations are carried out.

Selectors 110, 111 and 112 are connected at their output to buses DBI, DBP and DBF, respectively. The bus DBI is a direct communication link between memory 40 and AU 50. The buses DBF and DBP comprise buses 100 and 101, respectively. Buses DBF and DBP are connected to a selector 113 which in turn is connected to registers 114 and 115 of a floating point arithmetic unit. The three buses (DBI, DBP and DBF) are connected through selectors 116 and 117 to input registers 118 through 121 of a floating point multiplier. A sine/cosine input unit 122 is also connected to selectors 116 and 117. Registers 118 and 119 are connected to a selector 123. Registers 120 and 121 are connected to a selector 124. The outputs of selectors 123 and 124 serve as inputs to a multiply unit 125 whose output is connected to a register 126 which in turn is connected to a carry add unit 127. The output is then connected to a selector 128, one input of which is the DBI bus. The output of selector 128 is connected to the P register 129 which is connected at one input to an A register 130. A companion B register 131 is connected with two inputs leading from registers 114 and 115. Registers 130 and 131 are connected to an arithmetic unit 132 whose output is connected to the register 133 which in turn is connected to a normalizer 134. The output of register 133 is connected by way of line 135 as a second input to register 130. Normalizer 134 is connected to the inputs of each of a W register 136, a Q register 137 and an S register 138. The outputs of registers 137 and 138 comprise the third and fourth inputs of registers 130 and 131. W register 136 and Q register 137 are connected at their outputs to selectors 139 and 140. The outputs of selectors 139 and 140 comprise the buses 101 and 100, respectively.

With the foregoing understanding of the relation between memory unit 40 and arithmetic unit 50, consideration will now be given to the structure of controllers 60, 70 and 80. In general, they are similar one to the other. Each comprises a set of test logic, a state address and transfer controller and a set of ROMs. In FIG. 3, the arrangement for the controller 80 is shown as an example.

Controller 80 includes an address register 200 which is nine bits wide. The contents of the register 200 comprises the address for ROM set 201. ROMs 201 have 512 states, each 160 bits wide. The 160 bits of each of the ROM states are distributed. Part of them appear on bus 84 and are employed for hardware control. The remainder appear on bus 202 and are utilized for next state transfer control. In this embodiment, forty-eight of the ROM bits are reserved for next state transfer control and 112 are employed for hardware control. Thus, the 112 lines are included in the bus 84 and forty-eight lines are included in the bus 202.

In operation, the initial address in register 200 is address 0. The nine address bits in register 200 permit addressing any one of the 512 states in ROM 201.

Bus 202 includes three 9 bit subbuses 202b, 202c and 202d. Each comprises nine lines to apply addresses B, C and D to an address selector 203. Three additional subbuses 202r, 202s and 202t lead to inputs of a test logic selector unit 204. Buses 202r, 202s and 202t each comprises seven lines. Thus, each may designate any one of 128 different tests to be run under the control of selector 204 to determine the next address in ROM 201 to be selected by the selector 203. That is, a test logic unit 204 has an output to selector 203 comprising a linkage 205. Operation of selector 203 is to provide on the input to the address register 200 the next state location in ROM 201. Tests a, c and d are sequentially sampled by the unit 204. If any one of them turns out to be valid, then the selector 203 will be caused to apply to register 200 the address of lines A, C or D to be applied to register 200. These tests by unit 204 are mutually exclusive so that only one address will be selected. If none of addresses A, C or D are selctd, then by default the address B will be selected and applied to register 200 as the next effective address operative in control unit 80. It will be clear that since the tests a, c and d are mutually exclusive, if none of them is satisfied, then by default the address B is selected. Therefore, test logic for B need not be implemented in unit 204 and is not found necessary.

It will be noted that a present address is applied by way of a bus 206 to an add one unit 207 to supply address A which is the present address plus 1.

It will now be understood that the system as above described operates to select the set of control bits that are transmitted to the various control points in the system by way of the bit lines included in bus 84. As noted, where 48 lines are employed in the next state address control section 201a, the remaining 112 lines are available for programmable control from the ROM 201 and are connected through bus 84 to selected control points throughout the system for the control of the arithmetic unit 50, the memory 40, and the addressing 30.

The system shown in FIG. 3 will be understood to be typical of structure of read controller 60, the address controller 70 as well as process controller 80. Only the number of address bits and the number and nature of tests selected differ between controllers 60, 70 and 80.

In FIG. 2, in control of the memory units 41 and 42, the addresses effective at any time therein are controlled by four counters A, B, C and X. These counters are selectable by ROM bits and are connected to memory units 41 and 42 by way of selectors 210 and 211. Thus, the address represented by the count in any one of counters, A, B, C or X can be made the address then being employed in memory units 41 or 42.

FIG. 4 illustrates the specific manner in which ROM bits appearing on bus 84, FIG. 3, are employed to counter X to provide a memory address. More particularly in FIG. 4, a pair of NOR gates 220 and 221 are connected at their inputs to a decoder 222. The output terminals 1 and 2 of decoder 222 are connected to the increment and clear inputs, respectively, of counter X. The increment terminal is connected by way of an inverter 223. The counter X has a carry output line 224 and an output bus 225 of eight lines which represents the memory address. The NOR gates 220 and 221 are operated to provide the logical OR of the three ROM controllers 60, 70 and 80. This allows any one of the controllers to access to counter X functions. Thus, input line 220r is connected to a particular bit in the ROM in read controller 60. Line 220a is connected to a particular ROM bit in the address controller 70. The line 220B is connected to a ROM bit in process controller 80. Similarly, lines 221R, 221A and 221P are connected to other selected ROM bits in the respective controllers 60, 70 and 80.

In practice, the ROM bits will present a true or high output unless programmed in the ROM for a 0. If any of the lines 220R, 220A or 220P is low, then the output line leading to decoder 222 will be true or high. The same effect is produced on the output line from gate 221 from inputs 221R, 221A and 221P.

Decoder 222 thus provides a logic decode on its two input lines. If the output of 220 is high and the output of 221 is low, then the increment line reading to the counter is enabled. If the output of gate 221 is low and the output of gate 220 is high, then the clear line of counter X will be enabled.

In this manner, the ROM program is employed to control the counter X in developing a new address which will appear on line 225 or to clear the counter as the case may be. If both the outputs of gates 220 and 221 are true, then no operation is performed. Likewise, no operation is performed when the outputs of gates 220 and 221 are both false.

The carry output of the counter X is utilized in test operations. More particularly, in operation of the test logic such as unit 204, FIG. 3, a test may require determination of whether or not the count in counter X, FIG. 4, is 255. In other words, has counter X reached its maximum count signifying that it has reached the last address in the memory. Thus, one of the tests may be to sample the state on line 224 and in response to such state select a specified next address by means of the selector 203, FIG. 3.

Three additional counters A, B and C are illustrated in FIG. 2. Operation of counter X has been illustrated as representative of the manner in which the controllers 60, 70 and 80 may interrelate with the memory unit 40 through all counters A, B, C and X.

FIG. 5 illustrates the manner in which the common flag control 90 is employed. In this embodiment, the flag bit PCF is set to indicate when a process is complete. For example, when in FIG. 4 a test determines the output of counter X is at count 255, this indicates that the data in one of the two memory sections 41 and 42 in memory 40 has been fully processed and is ready to restore the processed results back into central memory 11. In order to signal this condition, process controller 80 recognizing that the counter X has reached count 255, will select a next address in ROM 83 which will have an output bit signifying that the process is complete, i.e., this bit serves to set the process complete flag. That ROM bit is connected by way of line 230 through an inverter 231 to a flip-flop 232. The Q output of flip-flop 232 appearing on line 233 is thus the process complete flag appearing in unit 90.

Address controller 70 in carrying out its functions will test the flag on line 223. When address controller 70 finds the flag on line 223 set, controller 70 will then clear the flag by applying an input to line 234 and will also actuate unit 108, FIG. 2, to switch the selectors 102 through 105 reidentifying the roles that the two sections of the memory play.

FIG. 6 illustrates a flow diagram which is typical of an execution sequence embodying processor 20 of FIG. 1. FIG. 6 illustrates the process flow as controlled by process controller 80. Illustrated are the points throughout the process in which the control flags are set and made available for use in the various tests by the other controllers 60 and 70. The operation set forth in FIG. 6 is outlined in Table I.

TABLE I

| | |
|---|---|
| 300 | Start at state address 0. |
| 301 | Wait for list fetch to be completed by list controller. |
| 302 | List having been completed, the process begins and the pipeline is initialized. |
| 303 | Counter A is cleared to 0. |
| 304 | Wait for fetch complete flag to be set by the read controller. |
| 305 | With the fetch complete flag being set, fetch complete flag is reset and execution of the process begins. |
| 306 | Perform the process specified by the ROM program on a particular memory sample or samples. |
| 306a | Decrement element counter B. |
| 306b | Increment memory counter A. |
| 307 | Check to see if the total number of elements have been processed (ECB=0). |
| 308 | If total number have been processed, then set SRF flag to signal that buffer store is ready; set PCF process complete flag indicating all elements have been processed; and exit to state 000. |
| 309 | If all elements are not processed, then check to see if counter A equals 255. If not, repeat execution of loop for addition samples until counter B is not 0 and counter A equals 255. |
| 310 | If counter A equals 255, then enter a new state in which the buffer store ready flag is set. Then go back and await for a fetch complete flag to be set by read controller 60. This sequence continues until counter B = 0. |

Operation of processor 20 is started by two control lists: (1) an automatic transfer instruction (ATI); and (2) a command initialization list (CIL).

To begin processor operation, CPU 10 issues an ATI command to processor 20. The first word of the ATI, Table II, is used to initialize processor 20 and identify the operational controls. The second word of ATI is used to specify the central memory (CM) location of the beginning of the command initialization list (CIL). Following the two ATI words, processor 20 will store an initial all zero status to indicate that the ATI has been accepted and that the processor is executing the instruction.

TABLE II

ATI FORMAT

| | 0 | 7 8 | 9 | 10 11 | 12 | 13 14 15 |
|---|---|---|---|---|---|---|
| ATI-1 | CPU OP CODE | R M | I | $C_0$ $C_1$ | | DEV |

| | 0 | 15 |
|---|---|---|
| ATI-2 | BEGINNING MEMORY ADDRESS | |

R = Reset
M = Maintenance Mode
I = Inhibit CPU
C = Control Instruction (START, HALT, CONTINUE)
DEV = DMAC Device Addressed R = Reset — Processor 20 will accept at any time an ATI with R = 1. This causes an unconditional reset with no status reported. If the processor is busy when an ATI with R = 0 is detected, that ATI will be interpreted according to Table III. If a parity error is detected on the first ATI word, the reset command is not executed if specified. An interrupt and store status will be issued for any ATI or list parity error, and the command terminated.

M = Maintenance Mode — Processor 20 is a high speed device. Most operations require consecutive memory cycles to fetch and store data. At such times processor 20 will have access to all memory cycles and will prevent CPU 10 from obtaining memory access. The M bit is used, when set to one, to cause processor 20 to access memory on alternate memory cycles when a condition occurs such that consecutive cycles would normally be required. This bit is programmable for each ATI operation and allows CPU 10 to access memory at least on alternate memory cycles when set to one. This bit may be changed at any time (busy, halted or idle) by issuance of the proper ATI CONTINUE instruction.

I = Inhibit CPU — When an ATI is accepted with this bit true (I = 1), processor 20 will prevent CPU 10 from acquiring memory cycles until the operation is complete. (Execution of the last chained list). This bit may not be changed by a CONTINUE instruction.

issued while processor 20 is busy or halted, processor 20 will accept any change in the M bit, and continue its present operation without interruption. If a continue is issued while processor 20 is idle, the function will be a NO OP (ignored).

All execute commands in processor 20 require a CIL such as in Table IV. Each CIL occupies contiguous locations in memory 11. The number of words in the list is dependent upon the instruction specified from Table V. The number of list words for each command is fixed, but varies from command to command. While the format of the CIL is command dependent, certain general features are common. Most commands require up to three arrays, consisting of two input arrays and one output array. Some advanced operations also require auxiliary control arrays which are, generally, of fixed

TABLE III

```
         ┌─ Reset = 0
         │ ┌─ Maintenance Mode
         │ │ ┌─ Inhibit CPU
         │ │ │ ┌─ Control Instruction
         ▼ ▼ ▼ ▼
        ┌─┬─┬─┬─────┬───┐
        │0│M│I│C₀ C₁│DEV│
        └─┴─┴─┴─────┴───┘
         │ │ │        ATP       FUNCTION
```

|  | 0 | M | I | C₀ | C₁ | ATP | FUNCTION |
|---|---|---|---|---|---|---|---|
| (Start) | 0 | X | X | 0 | 0 | BUSY | BUSY STATUS, INTERRUPT, HALT |
|  |  | X | X |  |  | HALTED | BUSY STATUS, INTERRUPT, HALT |
|  |  | M | I |  |  | IDLE | BEGIN NEW OPERATION |
| (Halt) | 0 | X | X | 0 | 1 | BUSY | HALT OPERATION |
|  |  | X | X |  |  | HALTED | NO-OP |
|  |  | X | X |  |  | IDLE | NO-OP |
| (Continue) | 0 | M | X | 1 | 0 | BUSY | CONTINUE, Accept M |
|  |  | M | X |  |  | HALTED | CONTINUE, Accept M |
|  |  | M | X |  |  | IDLE | NO-OP |
|  | 0 | X | X | 1 | 1 | Any | Illegal Operation |

X - Indicates ignored $C_0C_1$ = Control Instruction — This two bit field is used to define the ATI instruction as one of the following four:

00 = START;
01 = HALT;
10 = CONTINUE; and
11 = Illegal.

An ATI instruction is accepted by processor 20 at any time when properly addressed. Therefore, an ATI may be issued when busy, halted or idle, and the interpretation of the control instruction will depend on the busy status. Table III shows the exact interpretation of the ATI control instructions which depend upon the busy, halted or idle status.

Normally, a START instruction is used to initiate a new operation and is usually issued when processor 20 is idle. Under this condition, processor 20 will interpret the second word of the ATI as the beginning CM location to fetch the CIL required for the operation.

If a START issued when processor 20 is busy or halted, processor 20 will respond with an illegal (busy) status, interrupt and halt. Notice that the I (inhibit CPU) and M (maintenance mode) bits are here ignored.

A HALT instruction is normally issued when processor 20 is busy, and is used to temporarily stop the operation in progress. If a halt is issued while processor 20 is in the halt or idle state, the function of the instruction will be a NO OP (ignored).

A CONTINUE instruction is normally used to continue an operation which has been previously halted by a halt control instruction. If a continue instruction is point format and are stored in consecutive locations in memory 11.

TABLE IV

| BASIC COMMAND INITIALIZATION LIST (CIL) | | |
|---|---|---|
| 1 | PCW | Processor Command Word |
| 2 | NOEW | Number of Elements Word |
| 3 | *FSA | Format Specification Vector A |
| 4 | AIA | Address Increment Vector A |
| 5 | SAA | Starting Address Vector A |
| 6 | *FSB | Format Specification Vector B |
| 7 | AIB | Address Increment Vector B |
| 8 | SAB | Starting Address Vector B |
| 9 | *FSC | Format Specification Vector C |
| 10 | AIC | Address Increment Vector C |
| 11 | SAC | Starting Address Vector C |
| 12 | AME | Address for Maximum Exponent |
| 13 | ANL | Address for Next List |

*included when Extended Format is specified (E=1)

The normal CIL consists of thirteen specification words which are used to totally specify operation of processor 20 and the arguments used or generated by the operation. Table IV includes this normal set of list words. For advanced operations which require additional list words, the list is simply extended to specify these additional words.

The first word of the CIL is a processor command word (PCW) whose format is shown in Table V.

TABLE V
PCW FORMAT

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| C | D | P | E |   | K | Σ |   |   |   |    | OP CODE |  |  |  |  |

C = CHAINING
D = DETECT MAXIMUM EXPONENT
P = PROGRAM CONTROLLED INTERRUPT
E = EXTENDED FORMAT
K = STACKING OPTION
Σ = SUM OPTION
OP CODE = AATP OPERATION CODE

PCW is acquired and identifies the command. The complete list is acquired. Processor 20 then begins execution of the command specified. Command processing in no way interferes with data processing by CPU 10 except where there is conflict for memory access. Processor 20 is a high-speed, non-time-critical peripheral. It is given a lower access priority than any other DMA device. Processor 20 continues the command execution (fetching data and storing resultants) until the command is complete. Upon completion of the command, the chaining bit is examined and if chaining is indicated, the next CIL list is acquired and the specified command is executed. This process continues until chaining is not specified. When the operation is completed, the operation complete status bit is turned on and the store status and interrupt sequence is executed. At the end of each command an optional interrupt can be issued. The status will be stored with each of these interrupts, and the processor 20 will halt. Operation may be reinitiated by a Continue ATI instruction.

An option (E) is included, as a part of the PCW, for specifying an extended format option or a restricted format option. For extended format (bit E = 1) three vectors A, B and C may be independent formats. Therefore, the format specification words for these vectors must be specified. For a restricted format option (E = 0), the format specification words for vectors A, B and C are not included as a part of the software list. The vector format is therefore identified to be a 32-bit floating-point. The normal software list in this case consists of only 10 list words.

C = CHAINING. This bit is used to allow chaining of command operations. When set to one, chaining is indicated, and upon completion of the existing command, the next CIL list will be fetched. The new command specified will then be executed. This method allows indefinite chaining without a new ATI being required.

D = DETECT MAXIMUM ELEMENT. If the detect maximum element option is specified (D = 1), then the exponent of each resultant to be stored in CM 11 is compared to an internal reference exponent which is maintained equal to the largest encountered exponent. The initial value of the reference exponent is supplied by the program at the location to which the resultant exponent is to be stored (AME). At the end of the command operation, this maximum exponent plus sign is stored in CPU memory 11 at the (AME) location specified by list word B. The format of this word is as follows:

| 0 | 1 | 7 | 8 | 15 |
|---|---|---|---|---|
| S | EXPONENT |  | - NOT USED - |  |

S = Sign,
7 = LSB

P = PROGRAM CONTROLLED INTERRUPT. Processor 20 will store initial status immediately after receiving an ATI START instruction (when idle). This status is always all zero and no interrupt is generated. The purpose of this initial status is to indicate to the CPU that processor 20 has successfully accepted the ATI instruction and has begun execution of the indicated operation.

If the PROGRAM CONTROLLED INTERRUPT is chosen (P =    ) for a list command, at completion of the command execution processor 20 will store status, generate an interrupt and halt. All status conditions from the last status store operation to the current status store will be reported and processor 20 status register is re-initiated (cleared to zero). The operation may be resumed by a Continue command, or terminated by a Reset command. For P = 0, the program controlled interrupt and status store sequence will not be executed at the completion of the command.

At the completion of a command operation in which chaining is not indicated, the ATI operation is defined to be complete, and status is always reported. Status Bit 0 (operation complete) will be true (1). If P (program controlled interrupt) is indicated, an interrupt will also be generated with this terminal status. For P = 0, no interrupt will be generated.

If an abort condition occurs, during any command execution, processor 20 will discontinue the operation in progress, store status, interrupt CPU 10, and return to idle. Status is accumulative from the last status reported. Status Bit 0 (operation complete) will be true, and the abort condition (bit 1 or 2) will be true.

If an ATI-START command is issued while processor 20 is busy or halted, it will respond with a store status, interrupt and halt. Status will indicate Bit 15 (Illegal ATI) is true. The command execution may be resumed by a Continue instruction, or terminated by a Reset instruction.

E = EXTENDED FORMAT. When this option is chosen (E = 1), Extended Format Option is allowed for each vector and the format specification words for each vector must be specified and included in the list.

When this bit is zero, the format for each vector is restricted to floating-point and the Value, Sign and Scale options for each vector are not applicable and assumed zero. The Format Specification Words for vectors A, B and C are not included as part of the list, and their positions are used for succeeding list words. This option allows for simplified CIL's (Lists) for operations which both uses and generates floating point vectors.

K = STACK OPTION. Stacking is indicated when this bit is set to one. The STACK option and SUM options are allowed for all arithmetic type operations and some advanced operations as shown in Table VI.

TABLE VI

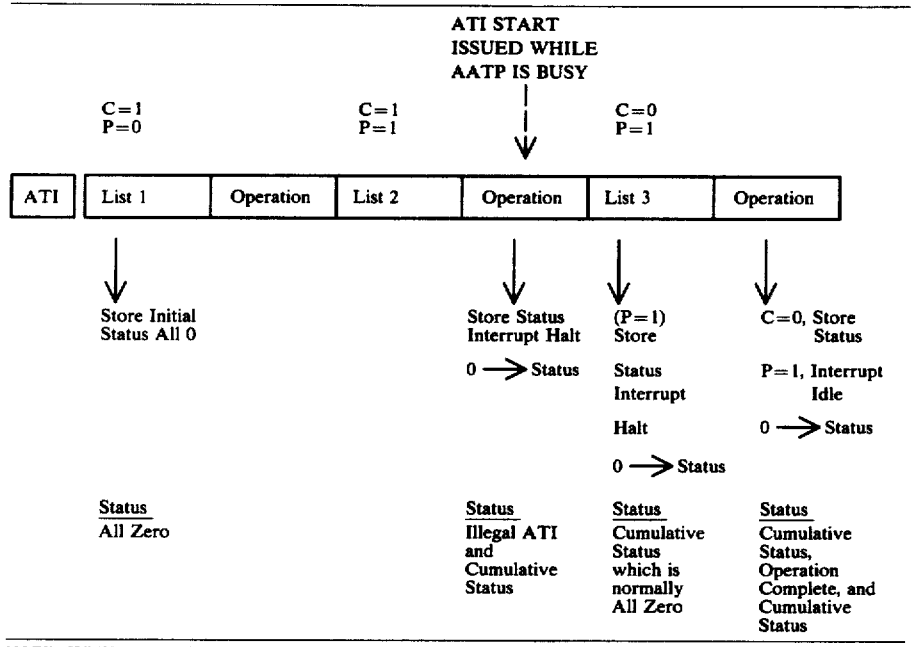

NOTE: CUMULATIVE STATUS IS FROM LAST REPORTED STATUS.

For all other operations the STACK option and SUM option are ignored and considered zero.

If the STACK option is chosen (K = 1), the results of each operation is added to the corresponding third array element and stored in place in this element. An example is shown in Table VII.

TABLE VII

| K | Σ | Operation |
|---|---|---|
| 0 | 0 | $C_i = a_i \cdot b_i$ |
| 0 | 1 | $C = \Sigma a_i \cdot b_i$ |
| 1 | 0 | $C_i = C_i + a_i \cdot b_i$ |
| 1 | 1 | $C = C + \Sigma a_i \cdot b_i$ |

Σ = SUM OPTION. This option, like the stacking option, is allowed for many arithmetic operations. When selected (Σ = 1), the results of the arithmetic operation are summed internally and not returned individually to CM 11. When the number of operations specified have been completed, the accumulated sum is returned to CM 11 as determined by the Stack option.

OP CODE (Processor 20). Processor 20 is organized to execute a variety of repetitive type operations on strings of sequential data. Several operations are of the basic arithmetic types; add, substract, multiply, and divide. Other operations are more advanced, and perform their function by the execution of algorithms which use the simpler basic operations.

All operations of processor 20 are specified by an eight bit field (8-15) of the PCW as follows:

Most operations may be modified by the Stack and Sum options. Bit field (12-15) is used, with bit field (8-11) as zero, to specify the basic Move, Scan, Real Arithmetic and Complex Arithmetic, with the option of Stack and Sum for each, except Scan.

Bit field (8-15) is used to specify the more advanced operations. The Stack option is allowed only for certain specified advanced operations. For advanced operations where the Stack and/or Sum options are not allowed, the K and/or Σ fields are ignored and assumed zero.

List Word 2

NUMBER OF ELEMENT WORDS (NOEW). This word of most CIL's (Command Initialization List) is used to specify the number of operation sequences before completion. More specifically, this word denotes the number of output resultant elements to be generated by the executed command if the output is a vector, or the number of elements in the input vector array if the output is a scalar. NOEW is a positive 16 bit integer of value 1 to $2^{16}$, where 0 is interpreted as $2^{16}$.

List Words 3 — 11 (ARRAY SPECIFICATION WORDS)

Each vector array is completely described by three words called the Array Specification Words (ASW), and consists of the following words for each vector A, B and C.

FSA — FORMAT SPECIFICATION for Vector A
AIA — ADDRESS INCREMENT for Vector A
SAA — STARTING ADDRESS for Vector A For each primary array, the CIL contains fields which are used to define the characteristics of the array and its elements. Although there are exceptions, which are detailed in the command descriptions, each primary array is described by a 48-bit Array Specification Word (ASW) in the CIL. The complete CIL contains three ASW groups of 3 words each if E = 1, or 2 words if E = 0, as illustrated in Table VIII.

TABLE VIII

| 0 | 1 | 2 | 3 | 4 | 7 | 15 | |
|---|---|---|---|---|---|---|---|
| FORMAT | V | S | | | SCALE | | FSA (E = 1) Only |
| ADDRESS INCREMENT | | | | | | | AIA |
| STARTING ADDRESS | | | | | | | SAA |

The basic program command format for most operations of processor 20 is summarized in Table IX.

TABLE IX

```
       0                    7 8  9 10 11 12 13 14 15
      ┌─────────────────────┬───┬─┬─┬───┬──────┐
      │  CPU OD CODE        │R M│I│C₀C₁│DEVICE│
      ├─────────────────────┴───┴─┴─┴───┴──────┤
      │         Beginning List Address         │
      └────────────────────────────────────────┘
        0  1  2  3  4  5  6  7  8             15
PCW   ┌─┬─┬─┬─┬──┬─┬─┬──────────────────────────┐
      │C│D│P│E│  │K│Σ│ OPERATION CODE           │
NOEW  │     NUMBER OF ELEMENTS WORD             │
*FSA  │FORMAT│V│S│           SCALE              │
AIA   │         ADDRESS INCREMENT A             │
SAA   │         STARTING ADDRESS A              │
*FSB  │FORMAT│V│S│           SCALE              │
AIB   │         ADDRESS INCREMENT B             │
SAB   │         STARTING ADDRESS B              │
*FSC  │FORMAT│V│S│           SCALE              │
AIC   │         ADDRESS INCREMENT C             │
SAC   │         STARTING ADDRESS C              │
AME   │     ADDRESS FOR MAXIMUM EXPONENT        │
ANL   │         ADDRESS OF NEXT LIST            │
      └─────────────────────────────────────────┘
```

R = RESET
M = MAINTENANCE MODE
I = INHIBIT CPU
$C_0C_1$ = DEVICE I/O CONTROL (START, HALT, CONTINUE)
DEVICE = DEMAC DEVICE ADDRESS FOR ATP
C = CHAINING OPTION
D = DETECT MAX EXPONENT
P = PROGRAM CONTROLLED INTERRUPT
E = EXTENDED FORMAT
K = STACK OPTION
Σ = SUM OPTION
F = VECTOR FORMAT
* V = VECTOR VALUE OPTION
S = VECTOR SIGN OPTION
SCALE = VECTOR SCALE FACTOR
*Not included in List When E = 0 (Extended Format Not Specified)

F = FORMAT. This three-bit field of the FSA is used to specify the format of the respective data array. The data format may be one of five types of input data arrays, or one of four types for output data arrays. Each data array may be independently specified as shown in Table X.

TABLE X

| 0 | 1 | 2 | |
|---|---|---|---|
| \[FORMAT\] | | | |
| 0 | 0 | 0 | 32-bit Floating Point Format |
| 0 | 0 | 1 | 16-bit Fixed Point Format |
| 0 | 1 | 0 | 32-bit 980A Fixed Point Format |
| 0 | 1 | 1 | 32-bit ASC Fixed Point Format |
| 1 | 0 | 0 | 32-bit Translation Format for Input Only |
| 1 | 0 | 1 | |
| 1 | 1 | 0 | (Illegal Codes) |
| 1 | 1 | 1 | |

Details as to such formats are shown in Table XI.

TABLE XI

```
   MSB                              LSB
  0 1                                15
  ┌─┬──────────────────────────────────┐
  │S│       BINARY NUMBER              │  16 BIT FIXED POINT
  └─┴──────────────────────────────────┘
   MSB                              LSB
  0 1                                31
  ┌─┬──────────────────────────────────┐
  │S│       BINARY NUMBER              │  32 BIT ASC
  └─┴──────────────────────────────────┘                FIXED POINT
   MSB                              LSB
  0 1            15 16               31
  ┌─┬─────────────┬─┬─────────────────┐
  │S│   BINARY    │S│    BINARY       │  32 BIT 980A
  └─┴─────────────┴─┴─────────────────┘  FIXED POINT
```

1) Sign bit is zero for positive data and one for negative data.
2) Binary point to the right of LSB.
3) Sign bit and binary number are represented in two's complement for negative numbers.

TABLE XI-continued

```
        MSB                        LSB
   0 1          7 8                 31
  ┌─┬────────────┬────────────────────┐
  │S│CHARACTERISTIC(C)│BINARY FRACTION(F)│   32 BIT
  └─┴────────────┴────────────────────┘   FLOAT-
                                           ING
                                           POINT
```

1) Sign bit is zero for positive data and one for negative data.
2) Binary point is to the left of the MSB of the binary fraction.
3) Sign and fraction are represented in Sign/Magnitude notation.
4) The characteristic is a biased exponent and represents the decimal range $16^{-24}$ to $^{+63}$.
5) The number represented by the above floating point notation is: $N = S \times F \times 16^{C-^{64}}10$

```
    MSB
   0 1           15 16       25 26   31
  ┌─┬──────────────┬──────────┬───────┐
  │S│BINARY NUMBER(N)│00000000│ GAIN  │  32 BIT
  └─┴──────────────┴──────────┴───────┘  TRANS-
                                         LATION
                                         FORMAT
                                         FOR
                                         INPUT
                                         DATA
                                         ONLY
```

1) Sign bit is zero for positive data and one for negative data.
2) Binary point is to the right of LSB.
3) Sign and fraction are represented in two's complement for negative numbers.
4) Gain field is six bit base two exponent which represents the applied gain.
5) The number represented by this format notation is: $N = S \times N \times 2^{-GAIN}$ V = VALUE. The element Value option is applicable only to data input arrays, and indicates that the affected array elements are to be treated as algebraic (normal) or absolute (positive number magnitude). This means that when the absolute option is chosen, the input data is to be converted to positive-absolute before being applied to the applicable algorithm.

In operations where the stacking option is allowed and chosen, the output array may be reused as a input. When used as an input, the value option is applicable. Therefore, it can conveniently be stated that the value option is applicable to any data input array.

V = 0 = Algebraic (normal); and
1 = Convert to Absolute

S = SIGN. The Sign option, like the Value option, is applicable only to input data arrays. This bit is used to specify that the input data, for the specified input array, is to be treated with normal sign or sign is to be inverted.

One obvious application of inverted sign is to implement substraction using a complement and add operation:

S = 0 = Normal Sign; and
1 = Invert Sign

SCALE FACTOR. This 9-bit field is used (when applicable) to specify a 9-bit 2's complement number which is to be interpreted as a scale factor for the array elements. The application of this number depends on whether the associated array is an input or output array.

For input arrays, this 9-bit field is interpreted as a binary 2's complement number exponent of base two ($2^N$), which is to be used as a scale factor (multiplier) for all elements of the input array. Which means, the Exponent field is to be used as an exponent base-two multiplier to be applied to all the input elements when they are converted into the internal floating point format.

For an output array, this 9-bit field is likewise interpreted as a scale factor, which specifies a binary (2's complement) exponent to be added to the floating-point exponent before output and format conversion if any.

An exception occurs in the case of stacking, where the output array is also used as an input array. In this case, the Exponent field applies only as an output array and therefore does not affect the array when used as an input.

AI = ADDRESS INCREMENT. The second word of the ASW is used to specify the array element Address Increment. This index value is represented as a 16-bit two's complement number. For most commands, negative indices are allowed for reverse memory addressing. The address increment value is used to indicate the "element" increment value; where each element is represented by a number of successive memory locations determined by the Format specified. The Address Increment value is used to determine each element address with respect to the previous element address. For AI equal to zero, the data element is a scalar and the Starting Address is always the same value.

When the Address Increment value for any ASW is zero, the array is specified as a single element vector (scalar). Processor 20 recognizes AI = 0 as a scalar and does not fetch the scalar repeatedly, but maintains its value internally for reuse throughout the command execution. In general, the CM address for the ($i$)th element is:

$$CM_i = SA + i (AI)$$

where SA = Starting Address.

SA = STARTING ADDRESS. The third word of the ASW is used to specify the array element Starting Address in CM 11, and is usually represented as SAA, SAB, or SAC respectively for each array.

Each array used is separately indexed, and the output resultant array may be permitted to overlay a source array. That is to say, resultants can be stored "in place" of source data to conserve memory space.

List Word 12

AME = Address for Maximum Exponent. This word is used to specify the CM 11 Address of both the initial and the final maximum exponent fetched/stored by processor 20 when bit 1 of the PCW is true (Detect Max. Exponent D = 1). The contents of this address are not used or modified when D = 0.

List Word 13

ANL = Address of Next List. This word is used to specify the address of the first word of the next list when chaining is specified by bit 0 (C = 1) of the PCW. When the command execution is complete, processor 20 will automatically acquire the next list and execute the specified operation. This chained process will continue until a list is encountered with chaining not indicated (C = 0). This ANL word is always acquired, but is not used when chaining is not indicated (C = 0).

STATUS. Processor 20 will store initial sttus following any ATI instruction which initiates a new operation. The Program Controlled Interrupt will allow (when specified) status reporting at completion of selected command (LIST) executions. Any abort action will report status and generate an interrupt following the occurrence of such action. At the completion of an ATI operation, status will always be stored. If the Program Controlled Interrupt is chosen, an interrupt will also be generated. Table XII shows a bit assignment for the status word.

TABLE XII

| BIT | CONDITION |
| --- | --- |
| 0 | Operation Complete (Terminate) |

TABLE XII-continued

| BIT | CONDITION |
| --- | --- |
| 1 | Command Error (Abortive) |
| 2 | Command Parity Error (Abortive) |
| 3 | Data Parity Error |
| 4 | Exponent Overflow |
| 5 | Exponent Underflow |
| 6 | Divide by Zero Attempted |
| 7 | Fixed Point Overflow |
| 8 | |
| 9 | |
| 10 | |
| 11 | |
| 12 | |
| 13 | |
| 14 | Hardware Service Required |
| 15 | Illegal ATI While Busy |

STATUS BIT 0 = Operation Complete. A "one" indicates the completion of an operation in which chaining is not indicated. This bit will also be "one" following an operation abort action.

STATUS BIT 1 = Command Error (Abortive). This bit is used to indicate illegal commands. When an illegal command is detected, processor 20 will terminate (abort) the operation in progress (if there is one), store status and issue an interrupt. Command Error status bit will be indicated.

ATI Control Instruction = 11
FSWA, FSWB Code = 101, 110, 111
FSWC Code = 100, 101, 110, 111
Illegal Op-Codes STATUS BIT 2 = Command Parity Error (Abortive). If an executable ATI or List Word is detected with a parity error indicated, processor 20 will abort the operation (return to idle), generate an interrupt and store status with this bit indicated. An interrupt will be generated regardless of the state of the Program Controlled Interrupt (P).

STATUS BIT 3 = Data Parity Error. If a data word is detected with a parity error indicated, the operation will continue, and this bit will be used to indicate a Data Parity Error at the next occurring store status sequence.

STATUS BIT 4 = Exponent Overflow. This bit is used to indicate that an operation has generated a result with an exponent greater than $7F_{16}$. When this condition occurs, $7F_{16}$ is substituted for the exponent and FFFFFF is substituted for the mantissa. The operation is continued and this status bit is indicated on the next occurring status store sequence. Sign is left uncharged.

STATUS BIT 5 = Exponent Underflow. This bit is used to indicate that an operation has generated a result with an exponent less than $00_{16}$. If this occurs, zero is substituted for the sign, exponent, and mantissa. The operation is continued and this status bit is indicated on the next occurring status store sequence.

STATUS BIT 6 = Divide by Zero Attempted. If an operation occurs with divide by zero attempted, processor 20 will set the resultant equal to the numerator value, and continue the operation. This status bit will be set and indicated at the next status store sequence.

STATUS BIT 7 = Fixed Point Overflow. If fixed point output is specified, and during this operation significant data bits are shifted beyond the MSB, an overflow occurs. This status bit is used to indicate such overflow conditions and is indicated at the next following status store sequence.

STATUS BITS 8–13 (Not Used).

STATUS BIT 14 = Hardware Service Required. Certain internal failures are monitored, and the occurrence of any will indicate that service is required to correct the situation. This bit is used to indicate this condition and is indicated at the next occurring status store sequence.

STATUS BIT 15 = Busy. If an ATI is received which indicates START, and the processor is busy or halted, processor 20 will halt the operation in progress, generate an interrupt and store status. This status bit will indicate the Busy condition. A Continue instruction must be issued to continue the operation.

The instruction repertoire of the processor is shown in Table XIII. The processor accommodates 36 separate instructions, many of which are unique in function and are intended to enhance and improve the seismic processing capabilities. Each instruction is controlled by a microprogram stored in ROMs 63, 73, and 83. Additional functions of the processor including correlation, convolution, root-mean squared (RMS), and data multiplexing/demultiplexing. These are possible as special cases of the operating repertoire. Microprogram capability may be modified or completely changed to perform a completely new set of functions. This flexibility allows the processor to be changed as requirements change or new techniques are discovered.

data as fixed point, floating point, or translation format. The output results may, in most cases, be specified as fixed or floating point format independent of the input. The output resultants, with one exception, would be of the same real or complex nature as the input. The exception is the complex conjugate multiply command which requires complex input data and produces a real resultant output.

Each instruction of processor 20 is controlled by a microprogram stored in ROMs 63, 73 and 83. Microprograms control each execution state of the processor to achieve the maximum possible execution speed. As the effective rate at which processor 20 can perform an operation depends upon the computation speed of arithmetic unit 50, the speed of format conversion in unit 33, and the rate at which data can be transferred to and from central memory 11. High operating speed is further attained by the pipeline operation where indexing, counting, and memory accessing is performed in parallel with the arithmetic operations on the data. In this embodiment, the processor 20 may achieve processing times as set out in Table XIV. The effective high speed of the processor 20 makes this system a highly efficient

TABLE XIII

AATP OPERATIONS

| CODE | MNEMONIC | K | Σ | OPERATION | LIST WORDS |
|---|---|---|---|---|---|
| 00 | | | | ** | |
| 01 | VSM | | | VECTOR SCAN MAX/MIN | 13 |
| 02 | VSP | | | VECTOR SCAN PEAKS | 13 |
| 03 | MLL | X | X | MOVE LINEAR LINEAR INDEXED | 13 |
| 04 | MVL | X | X | MOVE VECTOR LINEAR INDEXED | 13 |
| 05 | MLV | X | X | MOVE LINEAR VECTOR INDEXED | 13 |
| 06 | ESQ | X | X | ELEMENT SQUARE | 13 |
| 07 | ESR | X | X | ELEMENT SQUARE ROOT | 13 |
| 08 | VEA | X | X | VECTOR ELEMENT ADD | 13 |
| 09 | VES | X | X | VECTOR ELEMENT SUBTRACT | 13 |
| 0A | VEM | X | X | VECTOR ELEMENT MULTIPLY | 13 |
| 0B | VED | X | X | VECTOR ELEMENT DIVIDE | 13 |
| 0C | CEA | X | X | COMPLEX ELEMENT ADD | 13 |
| 0D | CES | X | X | COMPLEX ELEMENT SUBTRACT | 13 |
| 0E | CEM | X | X | COMPLEX ELEMENT MULTIPLY | 13 |
| 0F | CCM | X | X | COMPLEX CONJUGATE MULTIPLY | 13 |
| 10 | FFN | | | FFT FORWARD NATURAL/SCRAMBLED | 13 |
| 11 | FFS | | | FFT FORWARD SCRAMBLED/NATURAL | 13 |
| 12 | FIN | | | FFT INVERSE NATURAL/SCRAMBLED | 13 |
| 13 | FIS | | | FFT INVERSE SCRAMBLED/NATURAL | 13 |
| 14 | OTS | | | ONE TRACE SEPARATION | 13 |
| 15 | OTC | | | ONE TRACE COMBINATION | 13 |
| 16 | TTS | | | TWO TRACE SEPARATION | 13 |
| 17 | TTC | | | TWO TRACE COMBINATION | 13 |
| 18 | CDO | | | CHANGE DATA ORDER | 13 |
| * | | | | ** | |
| 20 | FXF | X | | FIXED FILTER | 14 |
| 21 | FXD | X | | FIXED FILTER AND DECIMATE | 15 |
| 22 | ITF | X | | INTERPOLATION FILTER | 15 |
| 23 | SVL | X | | SAMPLE VARIANT LINEAR FILTER | 17 |
| 24 | SVI | X | | SAMPLE VARIANT INCREMENTED FILTER | 17 |
| 25 | SVF | X | | SAMPLE VARIANT FETCHED FILTER | 18 |
| * | | | | ** | |
| 30 | BMR | | | BITWISE MATRIX ROTATE | 14 |
| 31 | RFP1 | | | REFORMAT AND PACK (WIGGLE) | 18 |
| 32 | RFP2 | | | REFORMAT AND PACK (VARIABLE AREA) | 18 |
| 33 | RFP3 | | | REFORMAT AND PACK (WIGGLE & VARIABLE AREA) | 18 |
| * | | | | ** | |
| 34 | SRT | | | SORT | 14 |
| 35 | MRG | | | MERGE | 15 |

* Operation Codes Not Used
K - Stacking
Σ - Summing

Commands are separated into two classes: (1) those that operate on real data only; and (2) those that operate on complex data only. Commands which require complex data assume that the data is arranged as two words, a real component of 16 or 32 bits followed by an imaginary component of the same format. The array which contains this data is configured with the real part followed immediately by the imaginary part. Most commands operate with the input data as real and the output peripheral in seismic processing systems.

TABLE XIV

| | AATP |
|---|---|
| INSTRUCTIONS | 36 |
| FLOATING POINT ARITHMETIC | YES |
| DATA FORMATS | 5 |
| FFT TIME FOR 8192 COMPLEX POINTS | 126ms |
| COMPLEX ELEMENT MULTIPLY TIME | 4.5μS |

TABLE XIV-continued

|  | AATP |
|---|---|
| CONVOLUTION TIME FOR 1024 POINTS | 10.1ms |
| ADD/SUB | Memory Limited 2.25µS |

Having described the invention in connection with certain specific embodiments thereof, it is to be understood that further modifications may now suggest themselves to those skilled in the art and it is intended to cover such modifications as fall within the scope of the appended claims.

What is claimed is:

1. A special purpose auxiliary array processor for use in conjunction with the central computer memory of a general purpose computer which comprises:
   (a) an address controller, having a ROM, operably connected to the central computer memory,
   (b) a read controller, having a ROM, operably connected to the central computer memory,
   (c) a process controller, having an ROM, operably connected to the central computer memory,
   (d) a dual memory and an arithmetic unit each operably connected to each of the controllers, and
   (e) a flag unit operable responsive to words from said ROMs and including logic circuit means for producing two mutually exclusive output signals operable to change output signals in respose to selected words from said ROMs, said address controller, data handler, and process controller being operably responsive to said output signals and synchronized thereby.

2. A special purpose auxiliary process controller for use in conjunction with a central computer memory of a central processor from which there extends a read data bus, a write data bus and an address bus comprising:
   (a) a dual memory unit connected to said read and write buses,
   (b) an arithmetic unit connected to said read and write buses,
   (c) a preprogrammed ROM process controller connected to control said dual memory unit and said arithmetic unit,
   (d) a preprogrammed ROM address controller, operably connected to the address bus, to control, store and fetch data from said central memory,
   (e) a preprogrammed ROM read controller connected to control said dual memory unit, and
   (f) a flag unit operably responsive to words from said ROM controllers and including logic circuit means for producing two mutually exclusive output signals operable to change output signals in response to selected words from said ROM controllers, said ROM controllers being operably responsive to said output signals and synchronized thereby.

3. A special purpose auxiliary processor, with internal memory, which acts as a direct memory access peripheral device to perform repetitive arithmetic operations on strings of sequential data or arrays in central memory of a central processor which comprises:
   (a) a preprogrammed read-only-memory, connected to a direct memory access controller, to generate fetch and store cycles and corresponding addresses in central memory,
   (b) data format conversion means connected to the direct memory access controller for formatting data going to or coming from central memory,
   (c) a preprogrammed read-only-memory, connected to said format conversion means, which controls the flow of data to and from said auxiliary processor,
   (d) arithmetic processing means connected to said format conversion means and to said internal memory for processing data from central memory,
   (e) a preprogrammed read-only-memory, connected to said arithmetic processing means, which controls the processing of data from central memory, and
   (f) common flag control means connected to each of said read-only-memories for causing ordered accessing and processing of data from central memory by the three preprogrammed read-only-memories.

4. The combination as set forth in claim 3 wherein said preprogrammed read-only-memories include microprograms which may be changed for special purpose adaptations.

5. The combination as set forth in claim 3 wherein said arithmetic processing means includes means for performing floating point real and complex arithmetic.

6. The combination as set forth in claim 3 wherein said format conversion means includes means for selecting optional program formats.

7. In a mini computer system wherein an auxiliary special purpose processor is connected to a direct memory access controller, said processor to process arrays of data in central memory of a mini computer, the combination which comprises:
   (a) preprogrammed, read-only-memory to control the accessing and processing of data from central memory,
   (b) means controlled by said read-only-memory for floating point real and complex arithmetic, and
   (c) means, connected to said central memory and to said arithmetic means, controlled by said preprogrammed read-only-memory for overlapping and paralleling the operations of accessing and processing data to achieve greater efficiency.

8. In a special purpose auxiliary digital data processor unit, the combination which comprises:
   (a) a control unit including input means, having a multi-state, multi-bit per state ROM and having output means for providing a selected state, multi-bit output wherein a portion of the bits of the selected state are employed for next state control,
   (b) an addess register having an input, and having output means connected to the input means of the control unit to store an address to select the next ROM state,
   (c) a test unit haing an output and having input means connected to the control unit output means to receive a portion of the bits of the next state control, for presentation of selected programmable test bits in a present state output of said control unit, a set of said test bits defining by a specific pattern of zero and one bits a predetermined test, said test unit along being connected to perform said predetermined test by checking for the existence of predetermined sets of conditions,
   (d) a multi-bit selector means having input means connected to the output of the test unit and responsive to said predetermined test, and having output means connected to the input of said register, and (e) a plurality of multi-bit lines extending from the output of said control unit to the input means of the selector means to present said address to select the next ROm state, one input of said selector means being caused to be connected to the input of said register through the output of said selector means by said selector being activated by said predetermined test.

9. The combination set forth in claim 8 in which one of the selector inputs includes an add one unit.

10. The combination set forth in claim 8 further comprising a memory address counter having inputs from the hardware control bits of the ROM output means, said counter being operable to set a flag when all the contents of said ROM have been processed.

11. The method of operating a hard wired special purpose processor from instruction and data in a central memory of a central processor comprising:

(a) sequentially loading sets of data from central memory into two like but separate repositories in said special purpose processor, (b) processing the contents of one of said repositories while unloading and loading the other to and from said central memory, (c) maintaining a count of the contents read out of each said repository for processing, and (d) switching the roles of said repositories when said count equals the capacity of one of said repositories.

12. In a data processing system where arrays of data words are available in a central memory of a general purpose computer, a special purpose auxiliary array processor which comprises:

(a) an arithmetic unit for array signal processing, (b) a processor memory having two independent sections, (c) a read bus and a write bus both connecting central memory to both sections of said processor memory and to said arithmetic unit, and (d) control means for alternating between said sections of said processor memory a first flow of data words between said central memory and said processor memory and a second flow between said processor memory and said arithmetic unit.

13. The combination of claim 12 wherein said control means comprises micro programmed ROMs connected to said arithmetic unit and said processor memory and wherein a central memory address unit responds to one of said ROMs to control reading and writing in said central memory.

* * * * *